United States Patent Office 2,770,568
Patented Nov. 13, 1956

2,770,568

P-CHLOROBENZYL P-CHLOROPHENYL SULFIDE AND ACARICIDAL COMPOSITIONS CONTAINING THE SAME

Douglas Greenwood, Meadows, Nottingham, and Herbert Aubrey Stevenson, Chilwell, Nottingham, England, assignors to Boots Pure Drug Company Limited, Nottingham, England, a British company No Drawing. Application March 9, 1953,
Serial No. 341,342

Claims priority, application Great Britain March 17, 1952

7 Claims. (Cl. 167—30)

The present invention relates to a new benzyl phenyl sulfide, namely, p-chlorobenzyl-p-chlorophenyl sulfide, which has been found to possess valuable acaricidal properties and to acaricidal dusts, dispersions, emulsions and aerosols containing such compounds which have properties which render them valuable for the control of the eggs and active stages of mites (acari), in particular the plant feeding Tetranychidae or red spider mites, e. g. *Tetranychus telarius* L and *Metatetranychus ulmi* Koch.

The compound according to the invention is obtained by reacting a p-chlorobenzyl halide with p-chlorophenyl thiol in the presence of sodium ethoxide.

The dispersions having a solid dispersed phase according to the invention may comprise the active ingredient in combination with a dispersing agent and/or a suspending agent in aqueous medium. For convenience the preparation may consist of active ingredient admixed with a dispersing agent and/or a suspending agent such that a dispersion is formed when the mixture is added to water. To facilitate the formation of a dispersion in this manner, the preparation to be diluted may also contain a water-miscible organic solvent, for example, acetone. The dispersions according to the invention also include suspensions in which the solid dispersed phase is admixed with an aqueous oil emulsion, the active ingredient being insoluble in the oil thereof, which oil is preferably a non-volatile oil, for example, liquid paraffin.

The emulsions according to the invention may comprise the active ingredient in combination with an emulsifying agent and an organic solvent, for example, xylene, or an aromatic solvent boiling within the range 80 to 300° C. It may be advantageous to add a non-volatile vegetable or mineral oil such as liquid paraffin to act as an activator and/or a sticker. The emulsion composition according to the invention may also contain a wetting agent. For convenience the composition may consist of active ingredient admixed with or in solution in an organic solvent as hereinbefore specified, together with an emulsifying agent and, if desired, a wetting agent such that an emulsion is formed on admixing the composition with water. Such compositions also form part of the present invention. The aqueous dispersions and emulsions herein described may be diluted with water before application to obtain a final concentration of active ingredient within the range 0.001–10.0% w./v. It is to be understood however that the invention is not limited to compositions which contain this concentration of active ingredient; the concentration in the solutions which are employed depends upon the requirements of the particular spraying machine which is to be used.

Dispersions of active ingredient in which the base is a pulverulent solid diluent also form part of the present invention. Such dispersions may contain up to 50% w./v. of the active ingredient.

We have found that it is possible to employ the compound according to the invention in the form of smokes, mists and aerosols. This method of application is very convenient when the plants, which it is desired to treat for the control of the mites, are located in an enclosed area for example, in a greenhouse.

Accordingly our invention also comprises compositions of the preparation of acaricidal smokes, mists and aerosols which contain p-chlorobenzyl-p-chlorophenyl sulfide as active ingredient.

Methods of producing pesticidal smokes, mists and aerosols are well known in the art. A number of compositions are known which are capable of generating smokes after ignition by means of a suitable fuse. In the preparation of compositions for the generation of acaricidal smokes it is necessary to select those compositions which on ignition do not generate sufficient heat to result in the decomposition of more than a small proportion of the active ingredient.

In the preparation of mists and aerosols, the active ingredient may be dissolved in a mixture of a non-volatile oil such as a vegetable oil and a miscible supplementary solvent such as cyclohexanone or acetone. The solution so obtained may be dispersed by mechanical means or by incorporating in the solution a volatile propellant such as Freon (a mixture of chloro-fluoro derivatives of methane and ethane).

The following non-limitative examples illustrate the invention:

*Example 1*

In the preparation of p-chlorobenzyl p-chlorophenyl sulphide, a mixture of 7.6 g. of p-chlorophenylthiol, 8.4 g. of p-chlorobenzyl chloride and 4.5 g. of sodium ethoxide in 150 cc. of absolute alcohol is heated under reflux for 2 hours before pouring the product into 250 cc. of water. The solid which separates is isolated by filtration and is recrystallised from alcohol. There is thus obtained p-chlorobenzyl p-chlorophenyl sulphide in the form of a colourless crystalline solid which has a melting point of 72° C.

(Found C, 57.75; H, 3.7: $C_{13}H_{10}Cl_2S$ requires C, 58.0; H, 37.)

*Example 2*

A composition prepared from the following ingredients is diluted with a sufficient quantity of water to form an aqueous emulsion which contains 0.1% w./v. of p-chlorobenzyl p-chlorophenyl sulphide.

| | |
|---|---|
| p-Chlorobenzyl p-chlorophenyl sulphide _____g__ | 10 |
| Xylene _____cc__ | 68 |
| Empilan TX (a condensate of ethylene oxide and a higher fatty acid mixture with lauric acid as the predominant fatty acid_____cc__ | 17 |
| Ethylan K (a polyethylene glycol ether of octyl phenol) _____cc__ | 5 |

*Example 3*

A dispersible powder is prepared by intimate admixture of the following ingredients.

| | Grams |
|---|---|
| p-Chlorobenzyl p-chlorophenylsulphide _____ | 20 |
| Belloid T. D. (a condensate of formaldehyde and an alkyl aryl sulfonate_____ | 8 |
| Kaolin _____ | 52 |
| Magnesium sulphate (exsiccated)_____ | 20 |

*Example 4*

In the preparation of a composition suitable for dilution with water to obtain a stable emulsion, sufficient p-chlorobenzyl p-chlorophenylsulphide is dissolved in a mixture of 10 parts by volume of Insem 108 (a proprietary non-ionic emulsifying agent which is believed to be an oleic acid ester of a glycol) and 90 parts by volume of "Petrochemical Solvent 20/1" (a proprietary hydrocarbon solvent boiling within the range 200 to 210° C.) to obtain a solution which contains 20% w./v. of active ingredient.

*Example 5*

A composition suitable for the preparation of an aerosol is obtained by dissolving p-chlorophenyl p-chlorobenzyl sulphide in a mixture of equal parts by weight of teaseed oil and cyclohexanone so as to obtain a final concentration of active ingredient of 25% w./v. This composition may be dispersed mechanically so as to obtain within the area to be treated a concentration of 0.1–20 g. of active ingredient per 1000 cu. ft.

We claim:
1. p-Chlorobenzyl-p-chlorophenyl sulphide.
2. An acaricidal composition comprising p-chlorobenzyl-p-chlorophenyl sulfide and a carrier.
3. An acaricidal composition comprising p-chlorobenzyl-p-chlorophenyl sulfide and a dispersing agent, said composition being adapted to form a dispersion when diluted with water.
4. An acaricidal composition comprising p-chlorobenzyl-p-chlorophenyl sulfide and an emulsifying agent and an organic solvent.
5. An acaricidal composition comprising p-chloro--benzyl-p-chlorophenyl sulfide and an emulsifying agent, an organic solvent and a wetting agent.
6. An acaricidal composition comprising p-chlorobenzyl-p-chlorophenyl sulfide and a pulverulent solid diluent.
7. An acaricidal composition adapted to be dispersed as an aerosol comprising a solution of p-chlorobenzyl-p-chlorophenyl sulfide.

References Cited in the file of this patent

UNITED STATES PATENTS

| | | |
|---|---|---|
| 2,159,025 | Hester | May 23, 1939 |
| 2,329,074 | Muller | Sept. 7, 1943 |
| 2,489,935 | Searle | Nov. 29, 1949 |

FOREIGN PATENTS

| | | |
|---|---|---|
| 238,942 | Switzerland | May 1, 1946 |

OTHER REFERENCES

Schriner et al.: 52 J. A. C. S. (1930), p. 2066.
Chem. Abstracts, vol. 30, col. 721 (1936) (item by Takahaski).
Jour. of Eco. Ento. for December 1948, pp. 875–882 (article by Metcalf).
Wilson, J. A. C. S. 72 (1950), 5200–5 (Chem. Absts. 45:4215a).
Tien Chich Chen 73 J. A. C. S. (1951), pp. 4694–4696.